United States Patent
Jager et al.

(10) Patent No.: US 7,781,935 B2
(45) Date of Patent: Aug. 24, 2010

(54) ENERGY CONVERSION SYSTEM WITH VARIABLE AIRGAP DISTANCE AND ENERGY RECOVERY METHOD

(75) Inventors: Thomas Jager, Grenoble (FR); Jean-Jacques Chaillout, Saint-Etienne-de-Crossey (FR); Ghislain Despesse, Saint Egreve (FR)

(73) Assignee: Commissariat a l'Energie Atomique, Paris (FR)

( * ) Notice: Subject to any disclaimer, the term of this patent is extended or adjusted under 35 U.S.C. 154(b) by 524 days.

(21) Appl. No.: 11/705,859

(22) Filed: Feb. 12, 2007

(65) Prior Publication Data

US 2007/0188153 A1     Aug. 16, 2007

(30) Foreign Application Priority Data

Feb. 13, 2006   (FR)   ................. 06 50511

(51) Int. Cl.
*H02N 1/00*     (2006.01)
(52) U.S. Cl. ..................... 310/309; 322/2 A
(58) Field of Classification Search ............ 310/309, 310/319, 331, 339; 361/290, 291; 290/1 A, 290/1 R; 322/52 A, 2 A; 73/514, 32, 514.36
See application file for complete search history.

(56) References Cited

U.S. PATENT DOCUMENTS

| | | | | |
|---|---|---|---|---|
| 2,036,084 A | * | 3/1936 | Roder | 333/24 C |
| 2,968,031 A | * | 1/1961 | Higa | 324/660 |
| 5,780,948 A | | 7/1998 | Lee et al. | 310/81 |
| 6,508,126 B2 | * | 1/2003 | Sakai et al. | 73/514.32 |
| 7,242,129 B2 | * | 7/2007 | Kim et al. | 310/309 |
| 7,345,372 B2 | * | 3/2008 | Roberts et al. | 290/1 R |
| 2001/0030488 A1 | | 10/2001 | Jerman et al. | 310/309 |
| 2004/0212195 A1 | | 10/2004 | Marek et al. | 290/1 R |
| 2005/0093302 A1 | * | 5/2005 | Miyazaki et al. | 290/1 R |
| 2007/0188153 A1 | * | 8/2007 | Jager et al. | 322/2 A |
| 2008/0129147 A1 | * | 6/2008 | Thiesen et al. | 310/319 |

FOREIGN PATENT DOCUMENTS

| | | |
|---|---|---|
| DE | 19643182 A1 | 4/1997 |
| GB | 553353 | 5/1943 |
| GB | 2311171 A | 9/1997 |

(Continued)

OTHER PUBLICATIONS

Chiu et al., "Design and Fabrication of a Micro Electrostatic Vibration to Electricity Energy Converter", Apr. 26-28, 2006, DTIP of MEMS and MOEMS.*

(Continued)

*Primary Examiner*—Karl I Tamai
(74) *Attorney, Agent, or Firm*—Nixon Peabody LLP

(57) ABSTRACT

A system for conversion of mechanical energy into electrical energy by electrostatic conversion that includes at least one fixed electrode (2) and at least one mobile electrode (4) that can be vibrated by mechanical energy, facing the fixed electrode, said fixed (2) and mobile (4) electrodes being separated at rest by an air gap distance ($\Delta$). The system includes means (12) of modifying the air gap distance as a function of the variation of the vibration amplitude of the mobile electrode (4). An energy conversion method using such a system is also described.

25 Claims, 5 Drawing Sheets

FOREIGN PATENT DOCUMENTS

WO            03/001657 A1      10/2003

OTHER PUBLICATIONS

Roundy et al., "Micro-electrostatic Vibration to Electricity Converters", Nov. 17-22, 2002, ASME International Mechanical Engineering Congress and Exposition.*

FrenchPreliminary Examination Seach Report, FA 676094 and FR 0650511, 4 pgs, (Oct. 10, 2006).

Xiao, Zhixiong et al., "Micromachined Variable Capacitors With Wide Tuning Range", Sensors And Actuators A, Elsevier Sequoia S.A., Lausanne, CH, vol. 104, No. 3, (May 15, 2003), pp. 299-305, XP004423413 ISSN: 0924-4247.

\* cited by examiner

ENERGY CONVERSION SYSTEM WITH VARIABLE AIRGAP DISTANCE AND ENERGY RECOVERY METHOD

CROSS REFERENCE TO RELATED APPLICATION OR PRIORITY CLAIM

This application claims priority of the French Patent Application No. 06 50511 filed Feb. 13, 2006.

FIELD OF THE INVENTION

This invention relates to a system capable of recovering mechanical energy from environmental movements (vibrations, shocks, flows, etc.) to convert it into electrical energy, using the electrostatic conversion principle.

BACKGROUND OF THE INVENTION

Known systems for recovery of mechanical vibration energy generally comprise a base rigidly fixed to a moving support, a mobile part making a relative movement due to its inertia with regard to this fixed part, a flexible link enabling relative displacement between the fixed and mobile parts and a converter for transforming mechanical energy from the mobile part to retrieve it in a different form (for example electrical).

In the case of an electrostatic conversion structure like that described in document US 2005093302 A1, energy is converted through a variable capacitor. This capacitor is formed from electrodes connected to the fixed vibrating support and electrodes connected to the mobile mass. The relative movement of these electrodes causes a variation in the value of the capacitance of the capacitor. This variation in capacitance is then used to transform the energy of the mechanical movement into electrical energy.

Electrostatic conversion structures may be classified in three categories.

A structure comprising one fixed electrode and one mobile electrode, the electrodes being arranged in two parallel planes, the mobile electrode being arranged at a distance from the fixed electrode and moving away from and towards the fixed electrode due to the vibrations.

A structure comprising a fixed electrode provided with fingers, a mobile mass provided with fingers, the fingers of the fixed electrode and the fingers of the mobile mass being interdigitized. During movement of the mobile mass in the direction of the fingers, the overlap between the fingers of the fixed electrode and the mobile mass varies in a plane.

For the third family, the structure is similar to the previous structure, however the mobile mass is moved perpendicular to the direction of the fingers.

The distance separating the fixed electrode and the mobile electrode at rest is called the air gap distance. This distance is fixed for each system described above. Thus, the displacement amplitude of the mobile electrode with respect to the fixed electrode is invariable, and is determined when the system is manufactured. The maximum allowable vibration amplitude in each case corresponds to the value of the air gap at rest between the fixed part and the mobile part.

Structures in known energy conversion systems are designed to be perfectly adapted to a well defined environment in terms of amplitude, vibration and deformation. Consequently, these structures become less efficient or even unusable for environments in which these parameters can vary with time.

The electrical energy retrieved during displacement of the mobile part depends on the variation in the capacitance that occurs during this displacement. For example, in the case of operation at constant charge on the variable capacitor, the energy that can theoretically be recovered for each recovery cycle is given by:

$$E = \tfrac{1}{2} U_{charge} U_{discharge} (C_{max} - C_{min}),$$

$U_{charge}$ and $U_{discharge}$ being the charge and discharge voltages at the capacitor terminals, and $C_{max} - C_{min}$ represents the maximum variation of the capacitance of the capacitor.

This energy is directly proportional to voltages at which the charge is injected and recovered on the capacitor, and the variation in the capacitance obtained during this movement.

Laws on electrostatic conversion structures giving the value of the capacitance as a function of the relative position X of the mobile part and the fixed part are of the type $1/(X-\Delta)$ and $1/(X-\Delta)^2$, in which $\Delta$ is the value of the air gap distance at rest. Therefore, the capacitance is minimum at rest when X is zero, and maximum when the movement amplitude moves towards the value of the air gap distance.

It is then observed that to maximize the recovered energy, it is preferable for the fixed and mobile electrodes to move as close as possible towards each other, which maximizes the maximum capacitance $C_{max}$ and therefore the final variation of the capacitance $C_{max} - C_{min}$.

Known types of conversion systems can only operate optimally with vibration sources that are stable in amplitude and/or frequency. These vibration sources rarely satisfy these stability conditions. The result is that the value of the maximum capacitance $C_{max}$ cannot be maximized at all times. FIGS. 6A and 6B show the variation of the variable capacitance as a function of a sinusoidal excitation with decreasing amplitude, for a known type of conversion structure in the plane. It is observed that the value of the maximum capacitance $C_{max}$ reduces very quickly with the vibration amplitude: a variation in the vibration amplitude of a few microns, for example when changing from an amplitude of 25 µm to an amplitude of 18 µm, results in a total capacitance variation changing from 170 pF to 70 pF. The recoverable energy is then divided by a factor of almost 3.

Consequently, one of the purposes of this invention is to propose a system for conversion of vibrational mechanical energy into electrical energy that can operate in an optimum manner, particularly with vibration sources with a variable amplitude.

PRESENTATION OF THE INVENTION

The above mentioned purpose is achieved by a system for conversion of vibrational mechanical energy into electrical energy by electrostatic or capacitive conversion, comprising at least one variable capacitor formed by a fixed electrode and a mobile electrode, and means of modifying the distance between the two electrodes at rest, so as to adapt the system to the characteristics, and particularly amplitude of vibrations in the external environment, and consequently to the vibration amplitude of the mobile electrode with respect to the fixed electrode.

The purpose of the invention can reduce the influence of the variation of the vibration amplitude on the finally recoverable energy by making the air gap of the conversion structure adaptable to its environment.

In other words, in one embodiment it is planned to make the energy conversion system tunable using an air gap distance auto-adaptive to the vibration source, so that this system is always adapted to optimize energy recovery.

This tuning may be done before an energy recovery phase by making an adjustment as a function of the expected vibration amplitude, or continuously during such a phase by a counter reaction control that will detect the vibration amplitude and modify the system in feedback.

The main purpose of this invention is a system for conversion of mechanical energy into electrical energy by electrostatic or capacitive conversion, comprising at least one fixed electrode and at least one mobile electrode that can be vibrated by mechanical energy, said fixed and mobile electrodes being separated at rest by an air gap distance, said system comprising at least an adjuster able to modify the air gap distance as a function of the variation of the vibration amplitude of the mobile electrode.

According to one embodiment, the adjuster enables adjustment before an energy conversion step. The adjustment means can then be composed of a set of calibrated spacers that can be placed between the fixed electrode and the mobile electrode, one or several spacers possibly being used. Passive adjustment means can also be inserted between the fixed electrode and the mobile electrode, and can be controlled to modify the air gap distance. They may then be, for example of the rack and pinion or slide and worm screw type.

Another purpose of this invention is a method of manufacturing a system according to this invention, by electroerosion and laser cutting.

In another embodiment, the adjustment means enable modification of the air gap distance during an energy conversion step.

The adjustment means can then comprise an actuator inserted between the fixed electrode and the mobile electrode and a control of said actuator. The actuator may be a motor, a cylinder, piezoelectric and/or magnetostrictive elements.

In one example embodiment, the control is manual.

In one example embodiment, the control is independent and automatically activates the actuator to adapt the air gap distance to the variation of the vibration amplitude. A manual control can also be provided, in addition to the automatic control.

In this example embodiment, the adjuster may comprise sensors detecting the variation in the vibration amplitude, and in which the control comprises an electronic unit comprising correspondence maps between values of the air gap distance and displacement amplitude intervals of the mobile part enabling optimum energy recovery.

For example, the sensors are of the accelerometer type or the variation amplitude or detection stop type.

Another purpose of this invention is a method for manufacturing a system according to the invention, wherein the actuator is integrated on silicon.

The actuator may be composed of piezoelectric elements deposited by cathode sputtering.

For example, the system may comprise several mobile electrodes in the form of fingers in which the fixed electrode comprises fingers, the fingers of the fixed electrode and the mobile fingers being interdigitized.

The mobile fingers move either along the direction of their largest dimension, or perpendicular to their largest dimension.

The fingers may advantageously be trapezoidal in shape.

Another purpose of this invention is a method of conversion of a mechanical energy into an electrical energy using a conversion system comprising at least one fixed electrode and one mobile electrode facing it, and at least an adjuster able to modify the air gap distance between the fixed electrode and the mobile electrode comprising a step to:

adjust the air gap distance before the energy conversion phase.

The energy conversion method according to the invention may then comprise the following steps:

determine the maximum expected displacement amplitude of the mobile part, choose a maximum air gap distance, these steps taking place before the step to adjust the air gap distance.

Another purpose of this invention is a method of conversion of mechanical energy into electrical energy making use of a conversion system comprising at least one fixed electrode and one mobile electrode facing it, and at least an adjuster able to modify the air gap distance between the fixed electrode and the mobile electrode, comprising a step to:

adjust the air gap distance during the energy conversion phase.

The energy conversion method according to the invention may then comprise the following steps during the energy conversion phase:

measure the displacement amplitude of the mobile part during the conversion phase, choose between air gap distance values and amplitude intervals from a correspondence map to achieve optimum energy recovery, these steps taking place before the step to adjust the air gap distance.

BRIEF DESCRIPTION OF THE FIGURES

This invention will be better understood after reading the following description and appended figures, wherein.

DETAILED PRESENTATION OF PARTICULAR EMBODIMENTS

Figure 1:
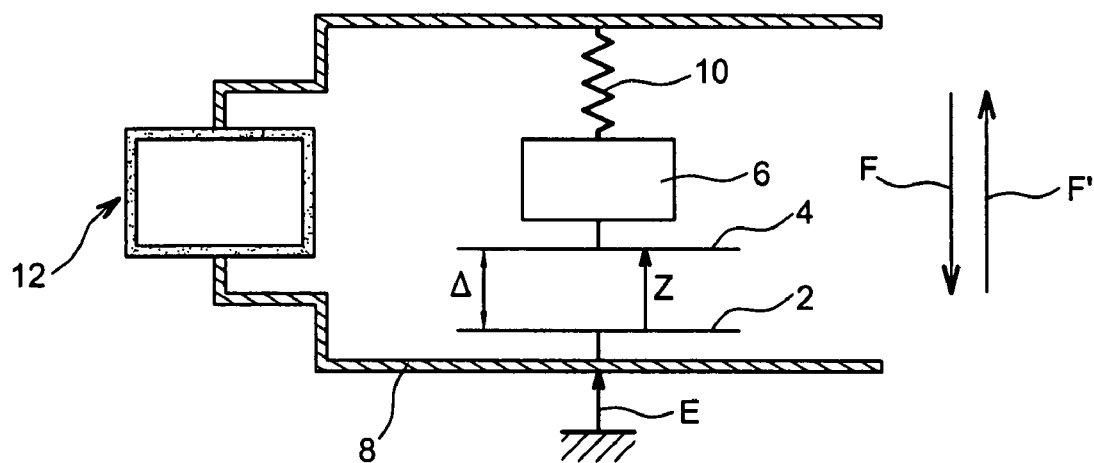
FIG. 1 shows a block diagram of a system according to this invention at rest.

FIG. 1 shows a block diagram of a system according to this invention, comprising a fixed electrode 2 and a mobile electrode 4 fixed to a moving mobile mass 6.

The mobile mass 6 and consequently the mobile electrode 4 are suspended by a flexible connecting means 10 from the fixed base 8.

The fixed electrode 2 is installed fixed on a fixed base 8. The system may be mechanically excited by an external mechanical excitation E, causing displacement of the mobile mass 6 and the mobile electrode 4 with respect to the fixed electrode 2 in a direction F or in a direction F'.

The fixed electrode 2 and the mobile electrode 4 are separated by a distance z, the distance z varying as a function of the mechanical excitation E.

Thus, the fixed electrode 2 and the mobile electrode 4 form a variable capacitor.

At rest, in the system as shown in FIG. 1, the two electrodes 2, 4 are separated by distance called the air gap distance $\Delta$.

The system also comprises means of adjustment 12 or an adjuster of the air gap distance $\Delta$ according to this invention, capable of moving the two electrodes 2, 4 further apart or closer together to increase or reduce the air gap distance $\Delta$.

As we will see in the remainder of this description, the adjuster 12 may be of the passive type, in other words they can fix a distance $\Delta$ before an energy recovery phase as a function of a planned mechanical excitation amplitude, or of the active type, and in this case the adjuster can modify the distance $\Delta$ during the energy recovery phase as a function of the variation of the amplitude of the excitation energy.

We will now explain operation of this system.

As soon as the system is subject to an external acceleration, the mobile mass 6 is moved relative to the fixed base 8, due to its inertia. The distance between the fixed electrode 2 and the mobile electrode 4 varies, causing a variation in the electrical capacitance of the system. The energy of this movement is transformed and recovered due to the electrical damping generated by the electrostatic forces applied between the electrodes 2, 4 of the capacitor.

Due to the system for adjustment of the distance $\Delta$ according to this invention, the distance $\Delta$ is adapted to optimize conversion of mechanical energy into electrical energy as a function of the amplitude of the excitation energy. The variation of the capacitance of the capacitor is thus maximized throughout operation, thus guaranteeing optimum energy recovery.

Figure 2A:
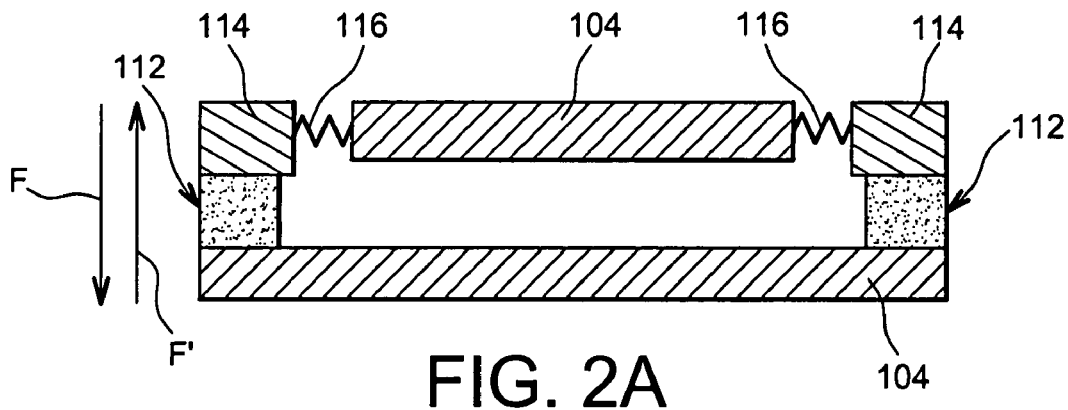
FIG. 2A is an example embodiment of a first method of making an energy conversion system according to this invention in a first configuration of the adjustment of the air gap distance.
Figure 2B:
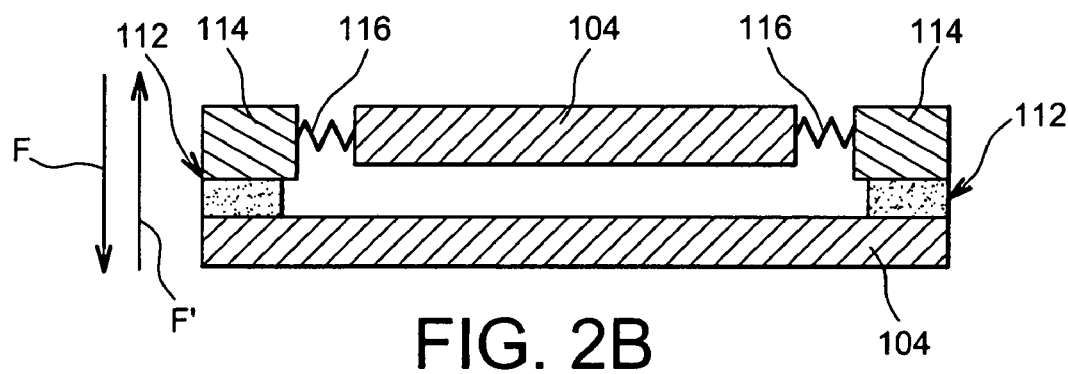
FIG. 2B is a diagrammatic representation of a second configuration of the adjustment of the air gap distance of the system in FIG. 2A.

FIGS. 2A and 2B show a first example embodiment of a system according to this invention, comprising a fixed part 102 connected to a mechanical energy source, a mobile part 104, and flexible connecting means 116 between the fixed part 102 and the mobile part 104.

The mobile part 104 can move perpendicular to its largest dimension in the directions F and F', under the action of the mechanical energy to be recovered.

The mechanical energy source is formed by movements of the external environment, for example in the form of vibrations, shocks, flows, etc.

The fixed part 102 and the mobile part 104 are formed from electrodes and are facing each other, thus forming a variable capacitor.

The two electrodes 102, 104 are separated by a variable distance z. At rest, this distance z is called the air gap distance $\Delta$.

The system according to this invention also comprises means 112 of modifying the air gap distance $\Delta$ or at least an adjuster 112 of the air gap distance $\Delta$. Thus at rest, the electrodes 102, 104 may be separated by an air gap distance $\Delta$ as a function of the adjustment imposed by the means 112.

In the example shown, the mobile electrode 104 is suspended from two pads 114 fixed by flexible connecting means 116.

Two adjusters 112 for adjusting the distance $\Delta$ are inserted between the pads 114 and the fixed electrode 102. As shown in FIG. 2, it is planned to modify the two adjusters 112 symmetrically, by adding the same thickness shim so as to keep the fixed electrode 102 and the mobile electrode 104 parallel to each other.

The air gap distance $\Delta$ is modified as a function of the amplitude of the external vibrations. To achieve this, the adjusters 112 may be formed by shims or calibrated mechanical spacers. Thus, the displacement amplitude of the mobile electrode 104 relative to the fixed electrode is adapted to the amplitude of vibrations converted by the energy conversion system.

An amplitude variation is required for the system shown in FIG. 2A larger than for the system shown on FIG. 2B, the adjustment shims 112 used then being thicker than the shims used for adjusting the configuration shown in FIG. 2B. The air gap distance $\Delta_1$ is then greater than the air gap distance $\Delta_2$.

However, this type of adjuster requires disassembly of the system every time that the air gap distance $\Delta$ is to be modified.

It would also be possible to plan to use more complex mechanical adjuster to enable a control to adjust the air gap distance $\Delta$ not requiring disassembly of the system during each adjustment. The adjuster 112 may be of the slide and worm screw type, or the rack and pinion type. The mechanical system is inserted between the mobile part 104 and the fixed part 102.

For example, in the case of a rack and pinion type system, the pinion may be fixed to the fixed part 102 and the rack may be fixed to the mobile part 104. Depending on the direction of rotation of the pinion, the pinion engages the rack and moves the mobile part 104 and the fixed part 102 towards each other or away from each other depending on its direction of rotation.

The maximum expected displacement amplitude may be evaluated as follows: the first step is to determine the value of excitation using an accelerometer. The displacement amplitude can then be deduced knowing the mechanical stiffness of the system.

Passive adjustment means are particularly suitable for macroscopic conversion systems, for example with a volume of one or several $cm^3$.

This type of system can be done by conventional precision mechanical techniques such as electroerosion or laser cutting. Thus, elements participating in adjustment of the air gap distance $\Delta$ may be done with a precision of the order of one µm; the distance can be adjusted with a precision of the order of one µm.

Operation of this system is similar to that described in FIG. 1, and will not be repeated.

Passive adjuster is used to increase the energy conversion efficiency, however this adjuster cannot be used to modify the value of the air gap distance $\Delta$ during energy recovery, if the vibration amplitude varies unexpectedly.

Figure 3A:
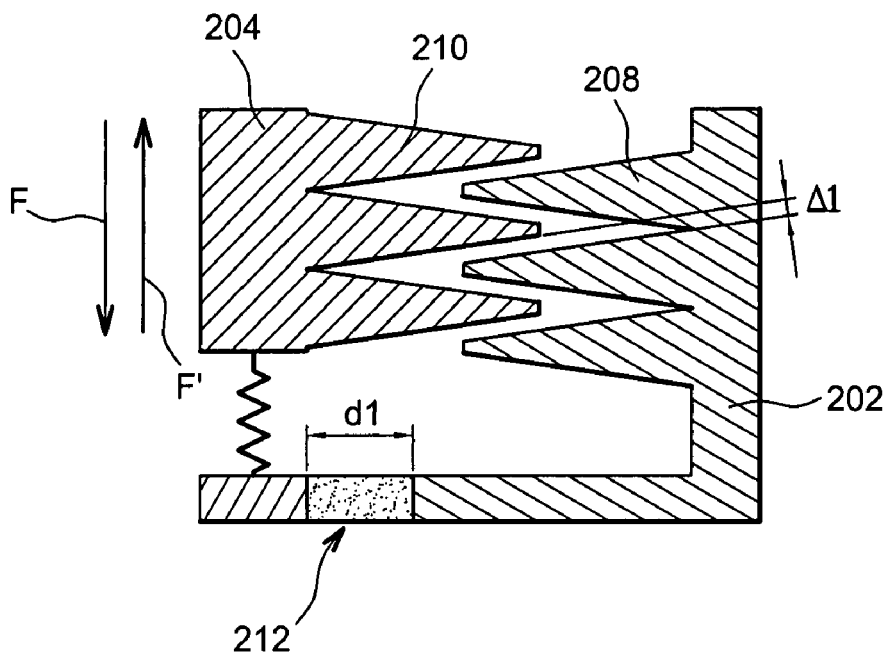
FIG. 3A is a diagrammatic representation of a second example embodiment for a conversion system according to this invention in a first configuration of adjustment of the air gap distance.
Figure 3B:
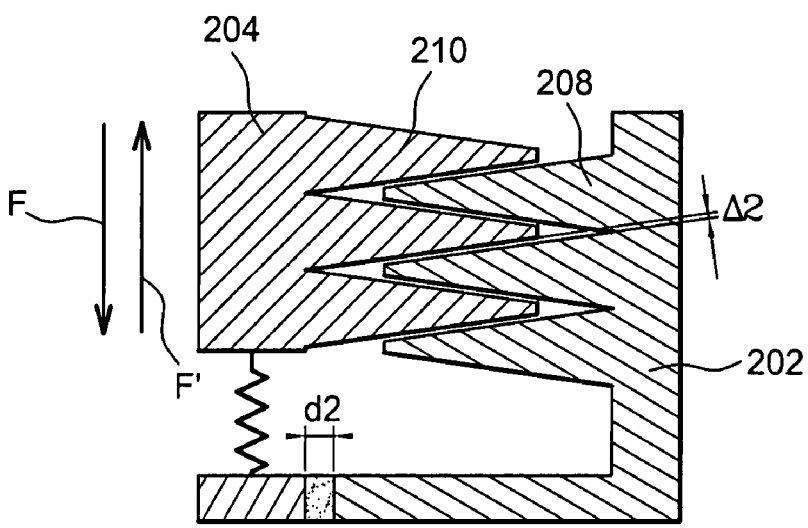
FIG. 3B is a diagrammatic representation of the system in FIG. 3A, in a second configuration of the adjustment of the air gap distance.

FIGS. 3A and 3B show a second example embodiment of a conversion system according to this invention, comprising a fixed part 202 and a mobile part 204.

The fixed part 202 and the mobile part 204 comprise interdigitized fingers 208, 210 forming facing electrodes. Thus, each pair of facing fingers 208, 210 forms a variable capacitor.

In the example shown, the mobile part 204 can move along a direction orthogonal to the axis of the fingers 208, 210, in a direction F or in a direction F'.

But displacement along a direction parallel to the axis of the fingers will also be possible.

In the example shown, the fingers 208, 210 advantageously have a trapezoidal profile to facilitate adjustment of the air gap distance $\Delta$. Regardless of the displacement of the mobile electrode with respect to the fixed electrode, in other words regardless of whether it is along the axis of the fingers or orthogonal to this axis, the air gap distance can be modified by modifying the distance between the electrodes in the same manner, in other words along the axis of the fingers.

Any finger shape can be suitable, for example rectangular or rounded shaped fingers.

The system also comprises at least one adjuster 212 of modifying the air gap distance Δ. As for the example in FIG. 2, it may be formed from shims or al spacers calibrated as a function of the application, or by more complex mechanical devices like those described above.

This type of adjuster enables passive adjustment of the system as described with reference to FIG. 2.

Systems could also be provided comprising an adjuster of the air gap distance Δ, called active means, comprising an actuator capable of progressively varying the air gap distance Δ to suit the variation of the vibration amplitude of the ambient environment, without any external intervention, said vibrations being symbolized by the excitation energy E on FIG. 1.

In the configuration in FIG. 3A, the thickness $d_1$ of the spacer is greater than the thickness $d_2$ of the spacer in FIG. 3B, therefore the air gap distance $\Delta_1$ is greater than the air gap distance $\Delta_2$.

Figure 4:
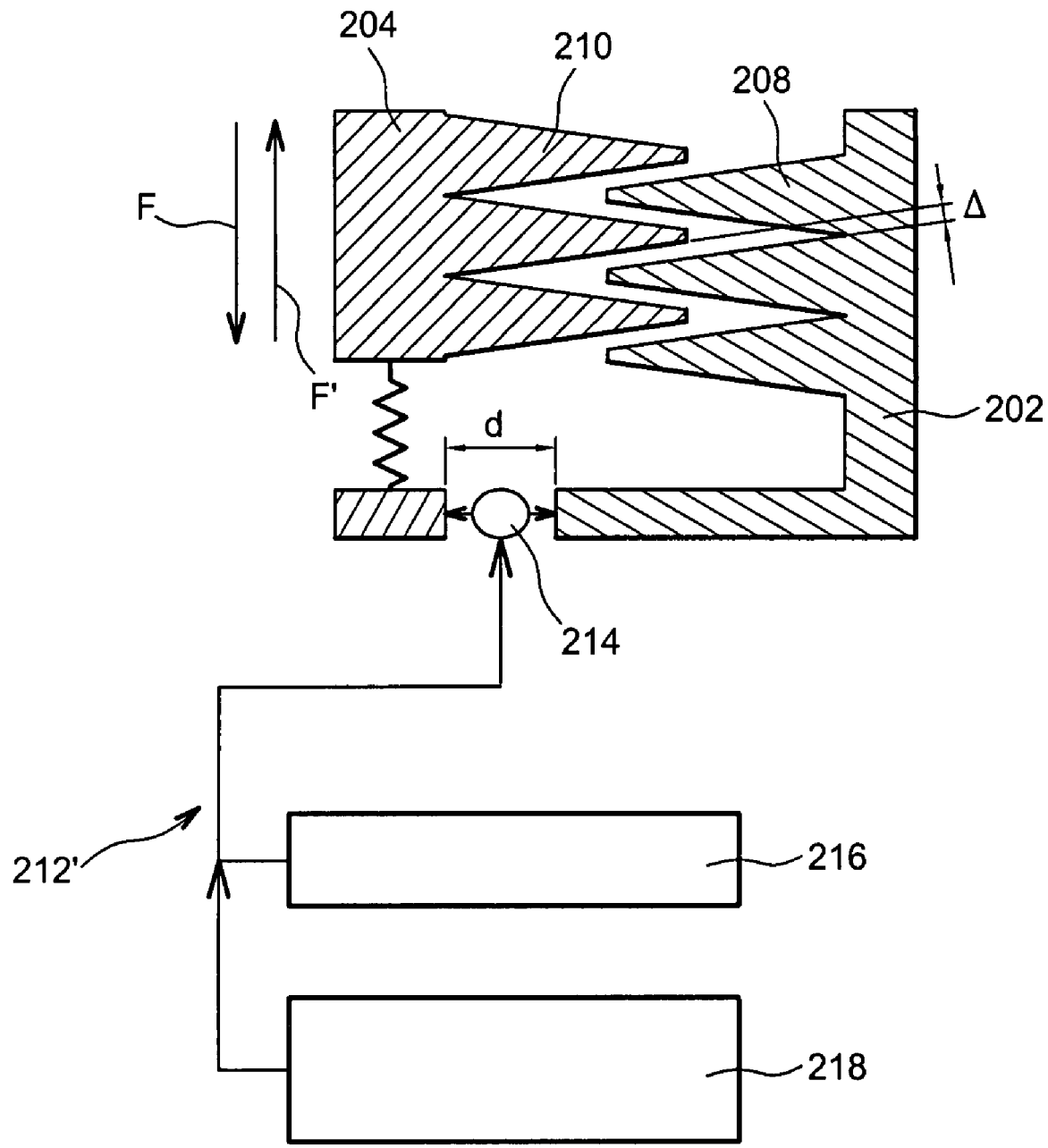
FIG. 4 is a diagrammatic representation of a second embodiment of a conversion system according to this invention, FIG. 5 contains a flowchart showing operation of the system in FIG. 4, FIGS. 6A and 6B are graphic representations of the change in the capacitance variation of a conversion system according to the state of the art.

FIG. 4 diagrammatically shows an energy conversion system comprising an active adjuster.

We will use the same references as were used for the description in FIGS. 3A and 3B, except for the adjuster that will be referenced 212'.

The adjuster 212' comprises an actuator 214 to adjust the air gap distance Δ, arranged between the mobile part 204 and the fixed part 202. This actuator 214 may be of any type, for example such as a motor, a cylinder, piezoelectric elements and/or magnetostrictive elements.

The actuator 214 is arranged between the mobile part 204 and the fixed part 202, such that when the actuator 214 is activated, the fixed and mobile parts move towards each other or away from each other.

It would also be possible to use a slide-worm screw or rack and pinion as the active adjustment means, advantageously in the case of microscopic for which frequencies are sufficiently low.

The adjuster 212' also comprises an automatic control 218 and an external manual control 216. The automatic control 218 uses an integrated reaction in the system.

For example, the manual control may be used to make first coarse preliminary adjustment.

The adjuster comprises sensors (not shown) capable of measuring the n of vibration amplitudes applied to the system in real time, or at instants in advance by a user.

Sensors may be of the accelerometer type or the vibration amplitude detection stop type mounted on the mobile part 204, and measure the variations of the displacement amplitude of the mobile part 24 relative to the fixed part 202.

An analysis of these amplitude variations is made by an electronic unit (not shown) that comprises a database in its memory, in which a value of the air gap distance Δ is associated with intervals of values of movement amplitudes of the mobile part, to enable optimum energy recovery.

The mobile part 204 and the fixed part 202 are separated by a distance d. In the example shown on FIG. 4, this distance is not equal to the air gap distance Δ due to the fingers with a trapezoidal profile. A correspondence map is then provided between the value of d and the value of Δ.

If the result of the comparison is that the air gap distance Δ is adapted to the movement amplitude, recovery continues. Otherwise, the air gap distance Δ is adjusted such that it is adapted to the movement amplitude of the mobile part.

This invention can be used to adapt the air gap distance Δ accordingly, to maintain an important variation of the variable capacitance regardless of the amplitude of the relative displacement between the fixed electrode 202 and the mobile electrode 204.

The active adjuster may be used in macroscopic conversion systems for which there is also an adjustment precision of the air gap of a few micrometers, in the same way as for the passive systems described above.

Operation of the conversion system is then independent and self-adaptive.

The active adjuster, and particularly the actuator(s), may also be made using microelectronic technologies; therefore, the conversion structure and the actuators of the microactuator type can be integrated at the same time, for adjustment of the air gap, in conversion systems smaller than a few mm.

For example, the conversion structure may be integrated on silicon by processes similar to those used to make micro accelerometers.

For example, microactuators may be made using piezoelectric elements, for example made of AlN or PZT deposited by cathode sputtering. It would also be possible to make microactuators from magnetostrictive thin films.

The electronic unit that manages the active adjuster may be made independently, discretely and/or in an integrated manner, to minimize the global size of the energy recovery system.

The active adjuster is also adapted to enable passive adjustment of the conversion system. This is done by programming the electronic unit so that it activates the actuator such that it adjusts the air gap distance to a given value before an energy conversion phase, and so that it maintains it throughout the entire conversion phase.

We will now explain operation of a system according to this invention comprising active adjuster.

The adjuster may be designed to adjust the interface distance at rest to a fixed value, and at the beginning of each recovery step, the system then being in a predetermined configuration. It would also be possible for the adjustment distance to remain equal to the adjusted distance at the end of the previous energy recovery step.

Figure 5:
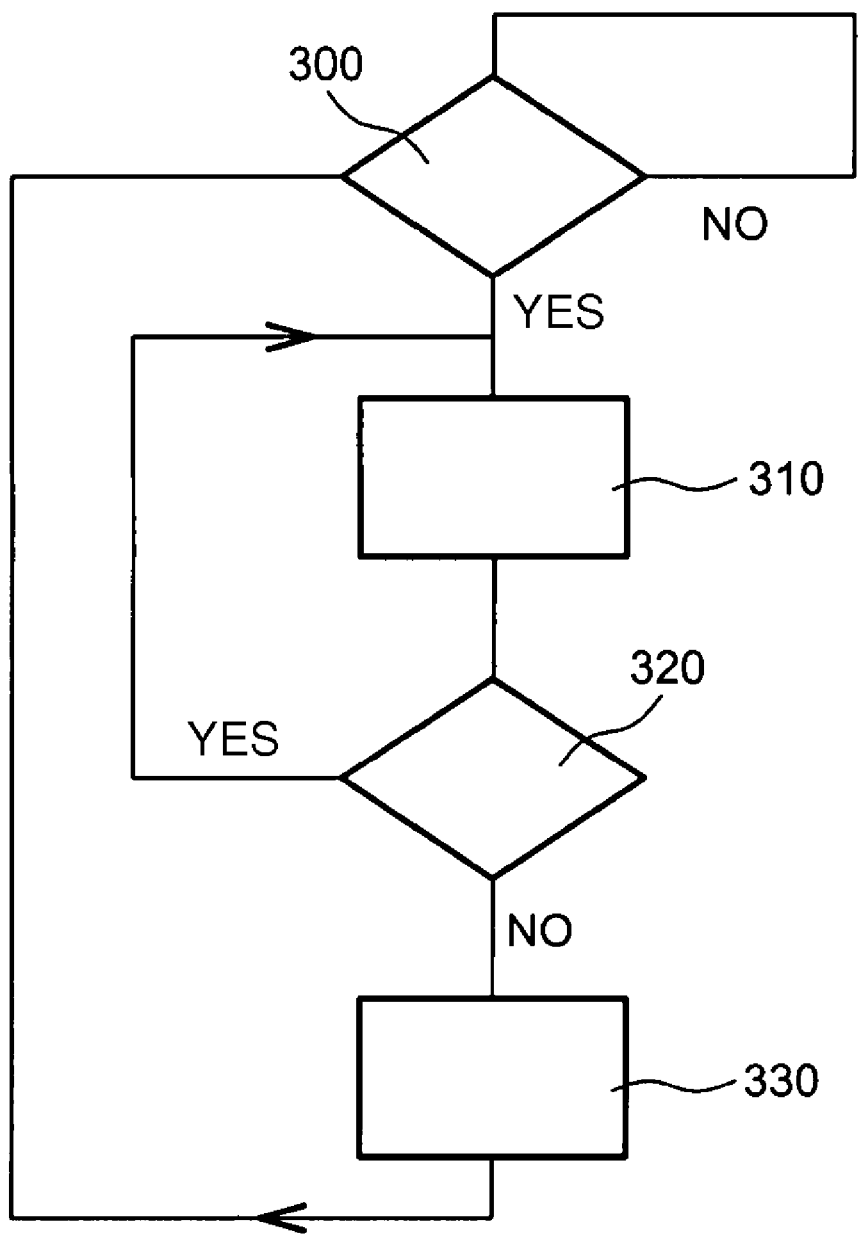
Figure 6A:
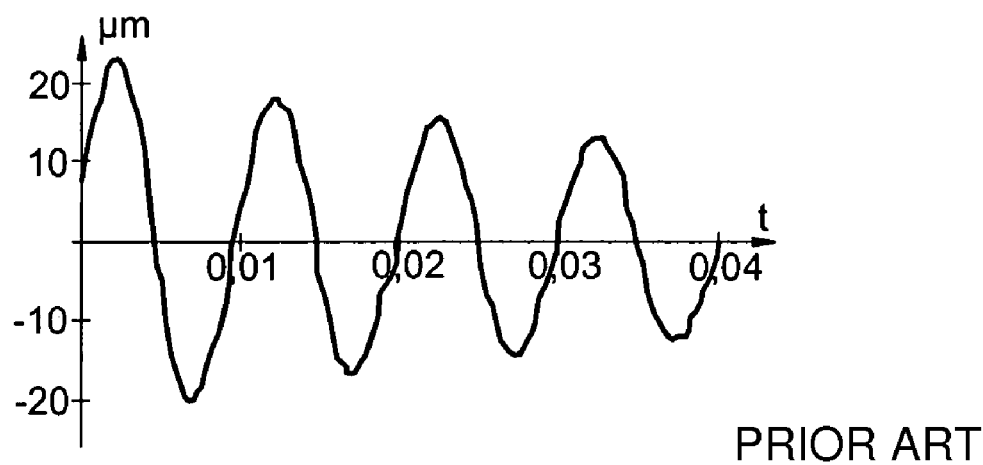
Figure 6B:
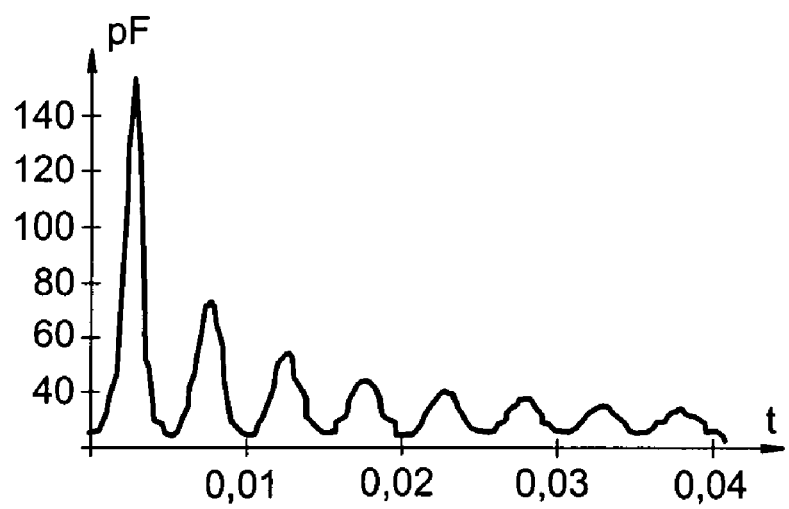

FIG. 5 shows an operating flowchart of the system in FIG. 4.

In step 300, the system verifies if it detects application of an external effort, by movement of the mobile part with respect to the fixed part.

If this is the case, the next step is step 310 in which energy recovery begins. The mobile electrode(s) move towards and away from the fixed part alternately.

Otherwise, monitoring of the system continues.

In step 310, the sensors measure the displacement amplitude of the mobile part.

In step 320, the electronic unit compares the value of the amplitude with pre-recorded values, and determines a distance value d and consequently an optimum value of the air gap distance.

If the real value of the air gap corresponds to the optimum value of the air gap, no adjustment is made and the procedure returns to step 310 to continue energy recovery.

Otherwise, step 330 takes place during which the electronic unit orders the actuator to increase or reduce the distance d, which consequently modifies the air gap distance depending on the conclusions of the comparison.

Step 300 is then repeated.

What is claimed is:

1. System for conversion of mechanical energy into electrical energy by electrostatic conversion, comprising:
   at least one fixed electrode;
   at least one mobile electrode that can be vibrated by mechanical energy, said fixed and mobile electrodes being separated at rest by an air gap distance;
   a sensor to detect a variation in vibration amplitude of the mobile electrode; and
   an adjuster configured to modify the air gap distance based on the detected variation of the vibration amplitude of the mobile electrode.

2. System set forth in claim 1, wherein the adjuster comprises:
   an actuator between the fixed electrode and the mobile electrode; and
   a controller coupled to the sensor.

3. System set forth in claim 2, wherein the controller automatically activates the actuator to adapt the air gap distance to the variation of the vibration amplitude.

4. System set forth in claim 1, wherein the adjuster enables adjustment before an energy conversion step.

5. System set forth in claim 4, wherein the adjuster is composed of a set of calibrated spacers that can be placed between the fixed electrode and the mobile electrode, one or several spacers being used.

6. System set forth in claim 4, wherein the passive adjuster is inserted between the fixed electrode and the mobile electrode, and can be controlled to modify the air gap distance.

7. System set forth in claim 6, wherein the adjuster is of the rack and pinion or slide and worm screw type.

8. System set forth in claim 1, wherein the adjuster enables modification of the air gap distance (A) during an energy conversion step.

9. System set forth in claim 8, wherein the adjuster comprises an actuator inserted between the fixed electrode and the mobile electrode and a control of said actuator.

10. System set forth in claim 9, wherein the actuator is selected from the group consisting of a motor, a cylinder, piezoelectric and/or magnetostrictive elements.

11. System set forth in claim 9, wherein the control is independent and automatically activates the actuator to adapt the air gap distance to the variation of the vibration amplitude.

12. System set forth in claim 11, wherein the adjuster comprises sensors detecting the variation in the vibration amplitude, and wherein the control comprises an electronic unit comprising correspondence maps between values of the air gap distance and displacement amplitude intervals of the mobile part enabling optimum energy recovery.

13. System set forth in claim 12, wherein the sensors are of the accelerometer type or of the variation amplitude detection stop type.

14. System set forth in claim 11, wherein the adjuster also comprises a manual control.

15. System set forth in claim 1, comprising several mobile electrodes in the form of fingers, and wherein the fixed electrode comprises fingers, the fingers of the fixed electrode and the mobile fingers being interdigitized.

16. System set forth in the claim 15, wherein the mobile fingers move along the direction of their largest dimension.

17. System set forth in claim 15, wherein the fingers move perpendicular to their largest dimension.

18. System set forth in claim 15, wherein the fingers are trapezoidal in shape.

19. Method of manufacturing a system set forth in claim 1, by electroerosion and laser cutting.

20. Method of manufacturing a system set forth in claim 9, wherein the actuator is integrated on silicon.

21. Manufacturing method set forth in claim 20, wherein the actuator is composed of piezoelectric elements deposited by cathode sputtering.

22. Method of conversion of mechanical energy into electrical energy using a conversion system comprising at least one fixed electrode and one mobile electrode that can be vibrated by mechanical energy facing it, the at least one fixed electrode and one mobile electrode separated by an air gap distance at rest, comprising:
   detecting a variation in vibration amplitude of the mobile electrode; and
   adjusting the air gap distance with an adjuster before the energy conversion phase, as a function of the detected variation in the amplitude of vibrations of the mobile electrode.

23. Energy conversion method set forth in claim 22, further comprising:
   determining the maximum expected displacement amplitude of the mobile electrode,
   selecting a maximum air gap distance based on the maximum expected displacement amplitude, wherein the determining and selecting occur before adjusting the air gap distance.

24. Method of conversion of mechanical energy into electrical energy making use of a conversion system comprising at least one fixed electrode and one mobile electrode that can be vibrated by mechanical energy facing it, the at least one fixed electrode and one mobile electrode separated by an air gap distance at rest, comprising:
   detecting a variation in vibration amplitude of the mobile electrode; and
   adjusting the air gap distance with an adjuster during the energy conversion phase, as a function of the detected variation of the vibration amplitude of the mobile electrode.

25. Energy conversion method set forth in claim 24, comprising the following steps during the energy conversion phase:
   measuring the displacement amplitude of the mobile electrode during the energy conversion phase,
   choosing between air gap distance values and amplitude intervals from a correspondence map to achieve optimum energy recovery, wherein the measuring and the choosing occur before adjusting the air gap distance.

* * * * *